INVENTOR.
STANLEY M. WEIR

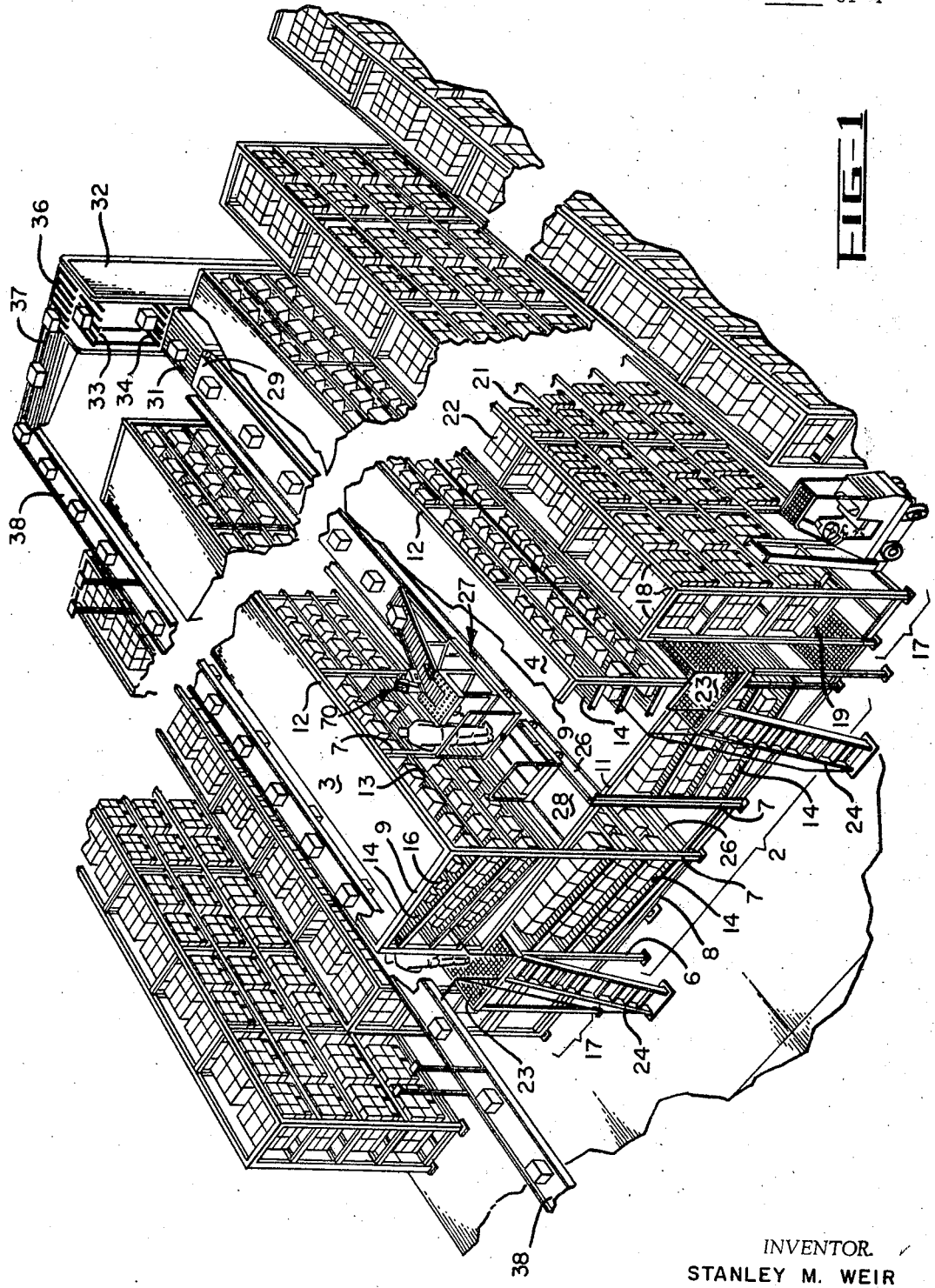

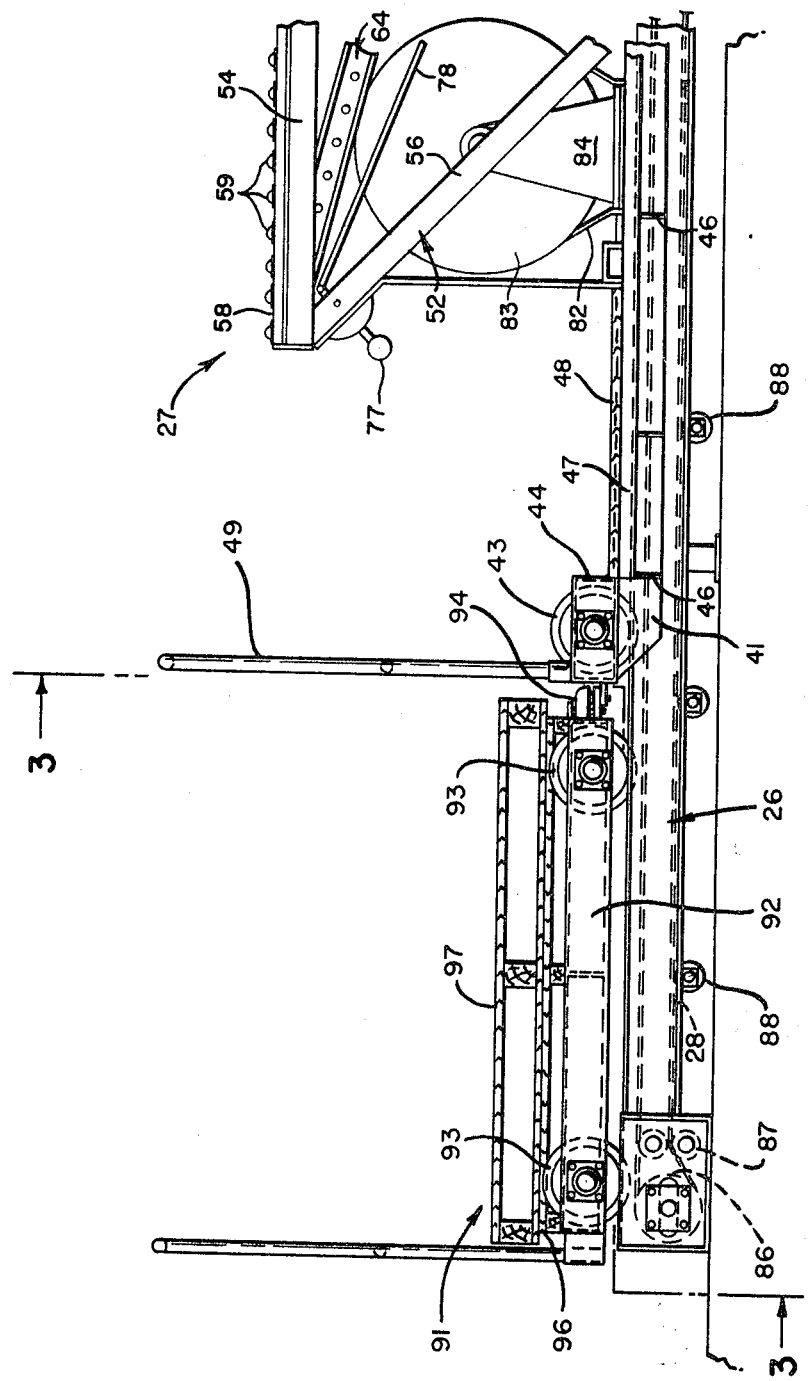

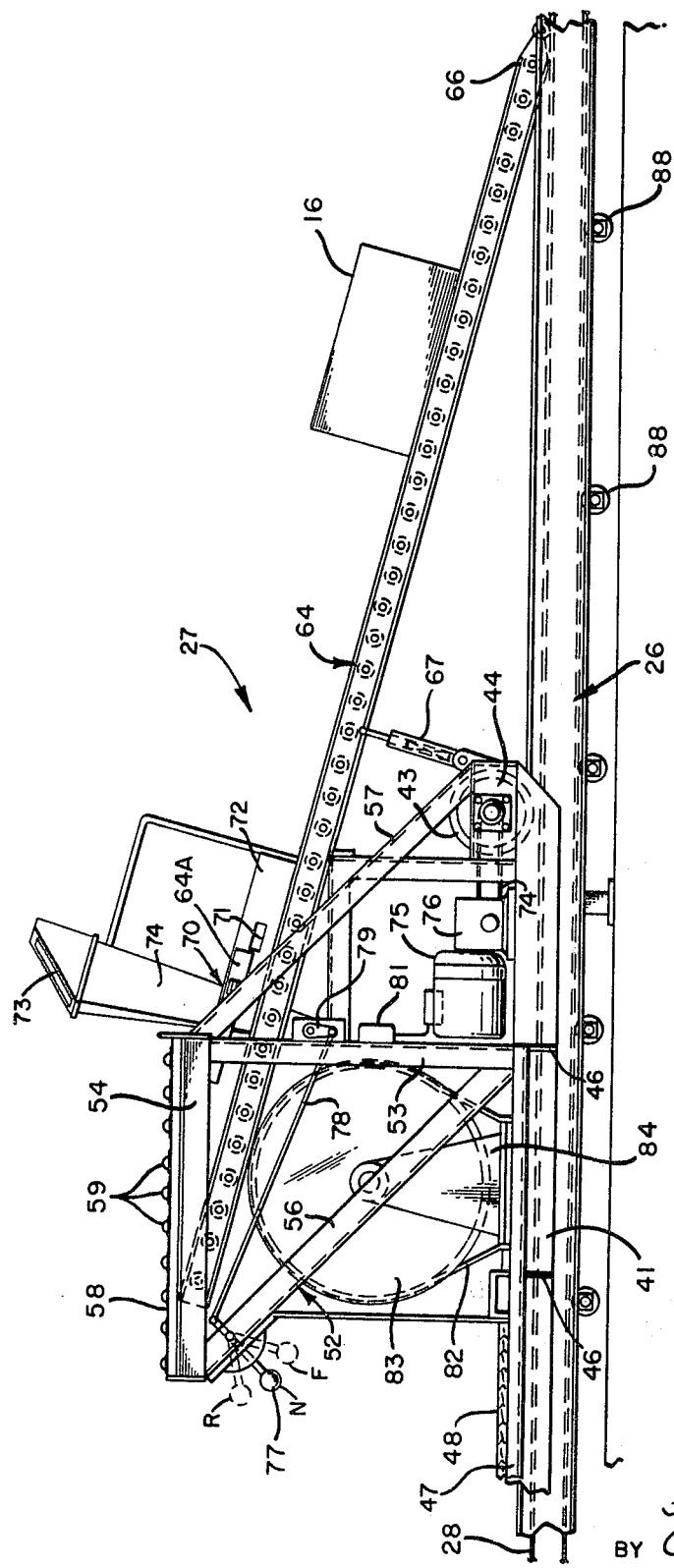

United States Patent Office 3,447,699
Patented June 3, 1969

3,447,699
WAREHOUSE SYSTEM WITH AN ARTICLE LABELLING DEVICE
Stanley M. Weir, Palo Alto, Calif., assignor to FMC Corporation, San Jose, Calif., a corporation of Delaware
Filed Jan. 15, 1968, Ser. No. 697,942
Int. Cl. E04h 5/02
U.S. Cl. 214—16.4                                    2 Claims

ABSTRACT OF THE DISCLOSURE

Power-driven warehouse equipment facilitates accurate and rapid selection of articles of commerce for distribution to warehouse outlets. A mobile trackmounted order-selection vehicle under the control of a warehouseman moves along an aisle formed by storage racks arranged in rows. Each rack is divided into compartments or slots, each slot containing cases, cartons or containers of a designated article of commerce. As the vehicle moves along the slots, selection of type and quantity of containers is made in accordance with a predetermined program carried by the driver of the vehicle in accordance with order picking instructions displayed for him by a display unit on the vehicle. Following selection of the requisite type and quantity of containers, each contanier is automatically labeled with a label which indicates the type, quantity and destination information imprinted thereon according to a program, and the containers are mechanically transported to an area where they are automatically diverted to accomplish assembly of orders in accordance with their proper destination.

BACKGROUND OF THE INVENTION

This invention relates to warehouse equipment, and particularly to power-driven warehouse equipment which facilitates selection and sorting of articles of commerce in containers destined for different consumer outlets.

Receipt by a main warehouse facility of a multiplicity of orders from a multiplicity of stores requires that orders must be filled with specified goods ordered by each store. An approach presently used is for a warehouseman to walk up and down the aisles between the racks of slots and pick the individual items that have been ordered by a retail store, loading these items onto a push cart. But such a process requires many man-hours because each clerk picks all of the goods destined for a single order one order at a time.

A more efficient method of filling such multiplicity of orders would be to provide one warehouseman with the means for selecting during a sinlge pass through the warehouse aisle all of the commodities ordered by a batch or group of stores. Accordingly, it is one of the principal objects of the present invention to provide warehouse equipment that, in conjunction with a predetermined program which lists the commodities to be supplied to a group of stores, may be operated by a warehouseman to permit selection and transport of the ordered merchandise for a group of consumer outlets or stores.

The function of selection of goods from individual storage slots or compartments in the main warehouse facility is generally effected at a point that is remote from the shipping or loading area at which the goods specified by various orders are assembled and loaded into trucks destined for the separate outlets. Accordingly, it is another object of the invention to provide a mobile vehicle which may range up and down the aisles of a main warehouse facility and transfer selected containers of merchandise onto a transport system which will deliver the selected containers an automatic sorting mechanism for further delivery to selected loading areas.

In order that selected containers of merchandise delivered to a sorter be segregated into appropriate groups for transport to designated outlets, it is essential that such containers be identified as to their destination. Accordingly, it is a still further object of the invention to provide, in conjunction with a motorized vehicle, means by which the selected containers are labeled in correlation with the program that dictates selection and destination of the containers.

It is, of course, desirable that warehousing equipment be designed to permit a single individual to handle a maximum number of containers in a given work interval. Accordingly, it is another object of the invention to provide a motorized vehicle capable of carrying a workman along with the containers selected so as to minimize fatigue of the warehouseman and increase his productivity.

Containers such as cartons and cases of merchandise are frequently palletized and handled with forklift trucks. Such pallets are conventionally stacked in rack slots or compartments and containers are selected directly from the pallets. Accordingly, it is yet another object of the invention to provide a place on the motorized vehicle on which empty pallets may be stacked as they are emptied during the selection process.

The invention possesses other objects and features of advantage, some of which, with the foregoing, will become apparent from the following description and the drawings.

SUMMARY OF THE INVENTION

In terms of broad inclusion, the invention comprises a warehousing system and apparatus therefor to facilitate the storage, selection, sorting and loading of merchandise destined for a multiplicity of consumer outlets or stores. In its simplest aspect, articles of merchandise packed in containers are stored in rack slots arranged in spaced rows. The slots are approximately as high as a man may conveniently reach, and the floors of the slots are inclined so that, as containers are removed from the front of the slot, the containers immediately behind the one removed will move to the forward end of the slot to facilitate successive removal. A motorized vehicle, preferably guided along a trackway in the aisle between opposed rows of rack slots, carries a warehouseman along the rows of racks to permit selection of predetermined types of merchandise from the separate rack slots. The selection is made in accordance with a program carried by the motorized vehicle and coded to indicate the type of merchandise to be selected, the quantity and destination thereof. Labeling apparatus, working in conjunction with the program indicating type, quantity and desination is effective to apply a coded label to a selected container. Means on the motorized vehicle is effective to deliver the selected and labeled container to a moving transport system designed to deliver the selected and labeled containers to a remote sorting and loading station. It is, of course, apparent that the rack slots may be arranged in tiers at different levels with motorized vehicles working each level. Trailer means are provided on the motorized jitney to facilitate removal of empty pallets on which containers have been stacked.

BRIEF DESCRIPTION OF DRAWINGS

FIGURE 1 is a schematic perspective view illustrating the warehousing system and apparatus of the invention.

FIGURE 2A is a side elevation in enlarged scale illustrating the rear portion of the motorized vehicle of the present invention and a pallet cart attached to the vehicle.

FIGURE 2B is a side elevation in enlarged scale illustrating the front portion of the motorized vehicle.

DESCRIPTION OF THE PREFERRED EMBODIMENT

Figure 4:
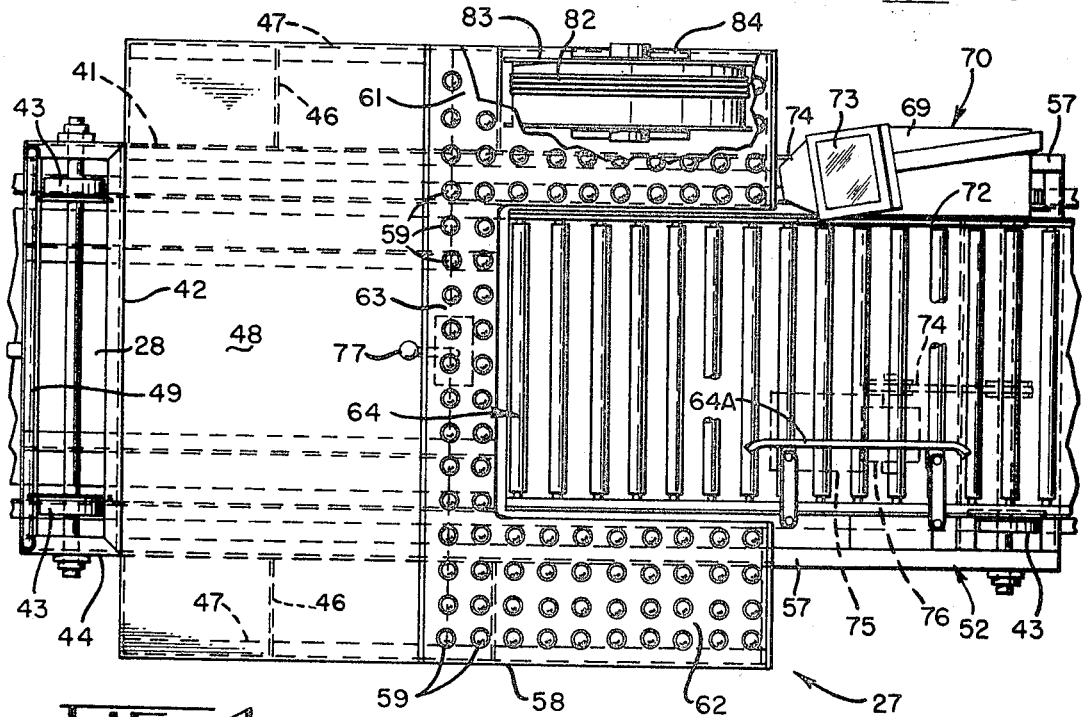
FIGURE 4 is a plan view of the central or main section of the vehicle in relation to the transport mechanism for carrying the selected merchandise to a sorting zone, the view being taken looking downwardly in the direction of arrows 4—4 of FIG. 2B.

The warehousing of merchandise for an interim pending distribution to retail outlets involves many different problems. One of these problems is the necessity to maintain a perpetual inventory indicating the goods on hand and their location within the warehouse. Another problem involves the size of order received at the warehouse facility, and the size of order likely to be shipped from the warehouse facility to retail outlets. In some instances, merchandise is received in the warehouse on pallets and is shipped from the warehouse on pallets, the quantities being such that off-loading individual containers from the pallet is unnecessary. In other instances, merchandise must be off-loaded from pallets, stacked in individual bins, and then picked for reshipment as individual containers upon appropriate order from a consumer outlet. The flow of merchandise within the warehouse facility must be arranged so that outgoing merchandise is not confused or mixed with incoming merchandise, and arranged further so that selection of merchandise may be accurately and rapidly made from storage. Where a commodity is received in pallet-sized loads, but is invariably shipped out in individual containers, it is necessary to arrange the warehousing system so that individual containers may be picked from pallet-sized loads.

Referring specifically to FIG. 1, there is provided a warehousing system and apparatus for handling merchandise stored in a warehouse, comprising a main storage section designated generally by the numeral 2, and made up of a pair of longitudinally extending and parallel storage racks 3 and 4 spaced apart as shown, with each rack preferably formed by a plurality of superposed tiers. Each rack is conveniently fabricated from structural iron and includes upright members 6 and 7, secured together adjacent their lower ends by a transversely extending rail 8, and secured together at their upper ends by a transversely extending rail 9. An intermediate rail 11 connects the vertical members 6 and 7, and extends across the space between the racks to tie the two racks together. Longitudinal stringers 12 connecting the upper ends of the upright members 6 and 7 extend the full length of the racks and connect opposite ends thereof. Vertically spaced between the stringers 12 and the floor on which the racks are supported are auxiliary longitudinal stringers 13, each of which extends between adjacent upright members 7, and pairs of which serve to support opposite ends of roller conveyors 14 which extend transversely through each rack from front to back.

As indicated in FIG. 1, each of the roller conveyors 14 is inclined toward the front of each rack so that containers of merchandise 16 placed thereon will be caused to move down the incline into position at the forward end of each rack. To facilitate filling of the roller conveyors 14, each of the racks is adapted to be filled from the rear and for this purpose an auxiliary storage area designated generally by the numeral 17 is provided closely adjacent the rear side of each of the main storage racks 3 and 4. Each storage area 17 is provided with an upright auxiliary storage rack constituting a framework 18, formed from structural iron and including vertical, transverse and longitudinal members secured together to form a rigid structure. Intermediate its top and bottom, the auxiliary rack is divided into compartments by transverse rails 19, within which compartments are positioned and supported pallets 21 loaded with containers 22.

Loading of the compartments or slots in each of the main racks is facilitated, especially in the upper tiers, by flooring in the form of a catwalk 23 connected to the floor by ladder 24. It will thus be seen that with the auxiliary racks filled with palletized containers, a warehouseman may walk along the catwalk, remove containers from the pallets, and load the roller conveyors in the adjacent main racks. In this manner, the roller conveyors are maintained full for facility of selection of various merchandise from the front side of each slot. It will, of course, be apparent that each of the slots contained in the main racks is indexed so that only merchandise scheduled to be stored in a specific slot is placed in pallet-sized loads in the adjacent auxiliary storage racks 18.

With each of the slots filled with a predetermined type of merchandise, it is only necessary for a warehouseman to range up and down the aisle in front of or between the two main racks and make his selection of merchandise ordered by consumer outlets As previously discussed, this may be effected by a warehouseman taking each individual order and selecting from the bins the types and quantities of merchandise indicated by the order. This procedure would ordinarily require that the warehouseman range up and down the aisle, first traversing the aisle in one direction and then traversing the aisle in the opposite direction, in order to effect filling of the order. Obviously, such procedure is time consuming and wasteful and to be avoided if possible.

A more efficient method of selection is to arrange the orders in sequence of merchandise corresponding to the sequence in which the designated merchandise is stored in the slots. According to this method the warehouseman would be required to make only one pass along the aisle and select from either rack whatever merchandise was indicated. This single order would ordinarily be collected on a pallet carried by a cart or pallet truck for delivery to the loading area for placement in the appropriate truck for transport to its proper destination. The next order would be filled in substantially the same manner. It will thus be apparent that such method of handling merchandise is also time-consuming and wasteful and is susceptible of introducing errors into the selection process and in loading it on a wrong truck, thus resulting in a given order of merchandise being delivered to the wrong store or consumer outlet.

A much more efficient method is to batch orders such that the warehouseman selects orders for a group of stores on one pass through the warehouse stock. The apparatus for carrying out this method is illustrated in FIG. 1, and includes the arrangement of specific merchandise in predetermined slots, arranged in a predetermined sequence. Disposed between the main racks 3 and 4 is a trackway 26, conveniently supported on the opposed uprights 7 or on the supporting floor when the trackway is associated with the lowermost tier of racks, and supported in a similar manner on the uprights 7 in conjunction with the transversely extending stringer 11 when the trackway 26 is supported in association with the tier next above the ground floor and in association with succeeding tiers. The trackway is preferably of narrow gauge and extends the full length of the main racks so that a mobile order selection vehicle, designated generally by the numeral 27, may move longitudinally along the trackway adjacent the fronts of the main racks. The trackway is preferably fabricated from structural iron in the form of opposed channels, with the depth of the channels being such that a longitudinally extending main conveyor belt 28 may be disposed between the channels for operation in cooperation with the mobile vehicle in a manner which will hereinafter be explained in greater detail.

As indicated in FIG. 1, the trackway, with the enclosed conveyor belt, extends the full length of the main racks and terminates at 29 in operative association with a transition conveyor 31 traveling in the same direction as the main conveyor belt, and adapted to receive thereon containers carried by the main conveyor belt. The transition conveyor operates on conjunction with an elevator mechanism designated generally by the numeral 32, and constituting in general the type of elevator mechanism described and claimed in copending application Ser. No. 530,057, now U.S. Patent No. 3,379,321 assigned to the assignee of the instant invention. For details of construction, reference is made to such copending application, the description of the elevator mechanism being included herein by reference.

In brief, the elevator mechanism comprises upper and lower pairs of sprockets driven by appropriate means and carrying endless chains on which at spaced intervals are secured a plurality of platforms 33 formed in the nature of parallel tines which are spaced apart and retained in a horizontal attitude at all times. The spaced tines of the platform 33 follow the movement of the chains while being maintained in a substantially horizontal plane by cam followers, and are moved upwardly through the spaces between support bars 34 onto which the transition conveyor 31 delivers containers. Thus, a container supported on the bars 34 will be elevated by a platform 33 rising from beneath it, and will be carried upwardly to be deposited on a transition platform 36, the individual rollers of which are power-driven to move the container onto an adjacent conveyor belt 37 which terminates in operative association with a main transport conveyor 38 as shown. As explained in said application Ser. No. 530,057, a gate mechanism is disposed at the entrance to the elevator and is actuated by the elevator to coordinate the movement of the articles onto the elevator with the upward movement of the platform 33 of the elevator.

The main transport conveyor preferably extends the entire length of the main racks, and terminates at an appropriate sorting area not shown herein but explained and illustrated in detail in the copending application noted above. It will thus be seen that the elevator mechanism at each end of each aisle is susceptible of elevating onto the main transport conveyor containers selected from both upper and lower tiers of both main racks 3 and 4, thus minimizing the amount of equipment required to handle a given amount of merchandise.

Figure 3:
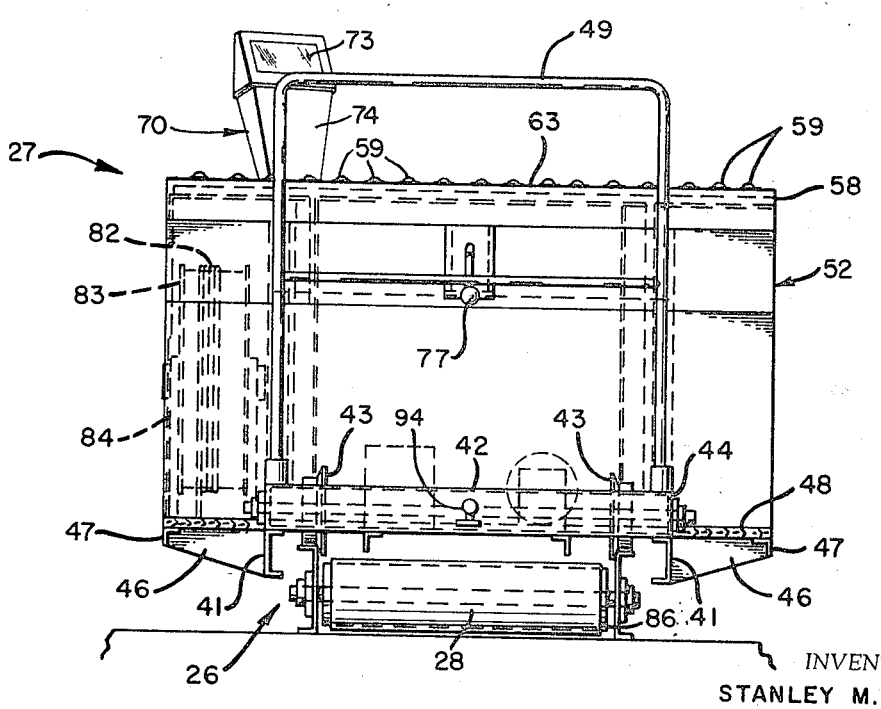
FIGURE 3 is a rear view of the vehicle illustrated in FIGURE 2A, the view being taken looking in the direction of arrows 3—3 of FIG. 2A.

Referring to FIGS. 2, 3, and 4, it will there be seen that the mobile vehicle 27 is comprised of a metal framework including longitudinal side rails 41, conveniently in the form of channels turned inwardly toward each other, and rigidly secured at opposite ends by cross members 42. Mobility to the vehicle is provided by pairs of wheels 43 journaled at each opposite end of the channel frame members on appropriate brackets 44. The wheels are preferably flanged as indicated best in FIG. 3 with the flange extending below the top surface of the longitudinal rails forming the trackway. Attached to each of channels 41 are a plurality of gussets 46, the outer ends of which are joined by longitudinally extending angle bars 47. Supported on the angle bars and intermediate longitudinally extending rails 41 is a workdeck 48, conveniently of plywood, on which a warehouseman may stand during selection of merchandise and operation of the vehicle. A guardrail 49 attached to the rear of the vehicle provides a measure of safety for the warehouseman riding on the workdeck.

The workdeck extends forward to about the midpoint of the frame defined by the rails 41 and 42. Supported on the forward end portions of the rails 41 is a rigid and upright framework 52 formed by vertical angle iron members 53 extending upwardly from the frame and connected at their upper ends by rearwardly extending angle iron members 54. Truss-type angle bars 56 and 57 having their upper ends rigidly welded to the rails 54 and their lower ends welded to the members of the frame lend rigidity to the framework. Extending transversely across the rails 54 and supported by the framework is a horizontal workplate or table 58 which forms a work surface provided with a plurality of freely rotatable ball bearings 59 as shown. The work table is preferably positioned with respect to the wordeck 48 so that a warehouseman standing on the workdeck may conveniently remove containers from the adjacent main racks and place them on the work table to be rollably supported thereon by the roller bearings 59. As shown best in FIG. 4, the work table is generally U-shaped with forward portions 61 and 62 spaced apart a distance corresponding to the width of the trackway 26 as shown. The portions 61 and 62 of the table 58 are joined together by a crosspiece 63, also provided with balls on which a container may be rollably supported.

Pivotally supported on the framework 52 adjacent the crosspiece 63 of the work table 58 is a light roller conveyor 64, preferably fabricated from aluminum, and inclined so that its lower end portion 66 is suspended above the conveyor belt 28. The roller conveyor is supported in this suspended position by one or more support posts 67 adjustable to vary the height of the forward or lower end portion 66 of the roller conveyor. It will thus be seen that containers placed by the warehouseman on the work table 58 may be moved across the table, oriented in a desired position and pushed onto the roller conveyor 64 so that they are transferred onto the moving conveyor belt 28.

Selection of merchandise is effected in accordance with the method described and claimed in my copending application Ser. No. 530,057 assigned to the same assignee as the present invention. As there described in greater detail, orders for merchandise received at the main warehousing facility from a multiplicity of ordering outlets are coded in terms of the type of mechandise required, the quantity required and its ultimate destination. Such information is programmed and processed through an appropriate computer which correlates the information at very high speed and causes it to be printed on individual labels correlated in terms of type, quantity and destination, and arranged on a tape made up of a backing strip on which labels are removably secured in single file array. In one arrangement, the indicia indicating the type and number of articles to be picked are man-readable, while the destination of the article is in machine-readable indicia.

The labels are arranged on each strip in correlation to the sequence in which the merchandise is stored in individual slots in the main warehousing facility. Such tape of successive labels is then loaded into an appropriate feed mechanism on the side of a housing 69 of a labelling machine 70 which is illustrated and described in much greater detail in my above noted copending application, included herein by reference. The tape of labels is fed upwardly to successively position each label behind an aperture 71 in a plate 72 mounted in fixed position alongside conveyor 64. As each package passes aperture 71, a pusher foot is actuated to push the label through the aperture and press it against the package.

The label, that is next behind the label adjacent aperture 71, is illuminated and its indicia is projected onto a screen 73 by a projection mechanism which is generally indicated by numeral 74. Thus, the operator can read the indicia telling him the type of article he is to pick next and the number of articles of that type that must still be picked.

Placement of the selected container on the work table 58 enables the warehouseman to properly orient the container and transfer the container onto the inclined roller conveyor 64 in an appropriate attitude for passage past the labeling machine 70. The labeling machine also works in conjunction with the tape so that the label, which was projected for viewing by the operator to initiate the selection of the container, is caused to be impressed and adhered to the side of the container selected while a spring-loaded presser bar 64A urges the package against the side plate 72. As mentioned above and as described in my above-identified copending application, each of the labels is also coded with machine-readable information capable of being read electronically at the sorting area in order to activate a diverting mechanism which will divert each individual container to a predetermined chute (not shown) associated with a particular destination or retail outlet.

Movement of the vehicle 27 along the trackway 26 is effected electrically through the use of a motor 75, connected through a gear box 76 with the front pair of wheels 43. A chain 74 conveniently connects the wheels 43 to the drive shaft extending from gear box 76. The motor is preferably a direct-current drive motor reversible so as to permit back-and-forth motion of the vehicle 27. Control of the motor is effected by the warehouseman by means of manipulating a handle 77, journaled on the framework 52 and connected by a link 78 with an appropriate control mechanism 79, linked through appropriate switch means 81 with the motor. As indicated in FIG. 2B, movement of the control handle 77 upwardly into the R position will effect reverse movement of the vehicle, whereas movement of the control handle 77 downwardly into F position will effect forward movement of the vehicle. A neutral N is also provided. Power to the motor is derived by means of a cable 82 (FIG. 3) arranged to wrap about a spring-loaded take-up reel 83 journaled on the framework 52 on appropriate gusset plates 84.

The main conveyor belt 28 onto which the containers are transferred from the roller conveyor 64 is preferably journaled at each opposite end on appropriate drums 86, with the belt being tensioned by take-up rollers 87. The upper and lower reaches of the conveyor belt are supported at intervals therealong by appropriate rollers 88.

Where containers of merchandise are stacked in the warehousing facility on pallets, and selection is made directly from pallet loads, it frequently happens that when all of the containers have been removed from a pallet, the pallet must then be disposed of in order that another pallet load may be placed in the rack. To facilitate such removal, a pallet cart designated generally by the numeral 91 is provided, as illustrated best in FIG. 2A. The pallet cart is preferably formed with a frame 92, supporting front and rear pairs of wheels 93, and during use is coupled to the rear end of the mobile jitney by a hitch 94. An appropriate floor or wooden framework 96 is provided to support the pallets 97 above the wheels 93. It will thus be seen that as the warehouseman progresses down an aisle selecting containers of merchandise, when he encounters a pallet that has been off-loaded completely, it is a simple matter for him to lift the pallet out of the compartment and place it on the trailer 91, thus enabling placement of another pallet loaded with containers within the compartment.

From the foregoing description it will be evident that the present invention provides a simple effective system for picking and processing articles in a warehouse. The disposition of the conveyor belt at a point lower than the work table 58, and its operation independently of the vehicle makes possible a relatively inexpensive conveyor system that is still capable of servicing the articles dispensed by the vehicle in all positions of the vehicle. The ability of the vehicle to move relative to the conveyor results in a system wherein the conveying system is effectively shortened or lengthened by the selective positioning of the vehicle.

It will be evident that the roller conveyor 64 could be replaced by a gravity chute, or a power-driven belt conveyor with or without transverse article-engaging cleats. Accordingly, in the annexed claims the term "transporter" will be used generically to include all means that are equivalent to the roller conveyor 64.

Having completed a detailed description of the invention so that those skilled in the art could practice the same, I claim:

1. A warehousing system comprising means defining article storage compartments disposed side-by-side along an aisle and having openings in said compartments facing said aisle for the removal of articles from said compartment, a vehicle movable along a path past the openings in said compartments, a labelling device disposed adjacent the path of articles on said vehicle and having means for applying a label to each carried by said vehicle, conveying means having a portion disposed in said aisle adjacent the base of said vehicle, and transfer means on said vehicle for receiving articles removed from selected compartments and directing them downward onto said conveying means for conveyance to a sorting area.

2. A system according to claim 1 wherein said labelling device has means for dispensing labels.

References Cited

UNITED STATES PATENTS 3,033,392   5/1962   Baumann et al.
3,343,692   9/1967   Arnot.
3,407,926   10/1968  Rosser _____ 214—16.4 X GERALD M. FORLENZA, *Primary Examiner.*

R. B. JOHNSON, *Assistant Examiner.*

U.S. Cl. X.R.

186—1